United States Patent

Keenan et al.

[11] Patent Number: 5,813,613
[45] Date of Patent: Sep. 29, 1998

[54] APPARATUS FOR SPREADING MATERIAL AND A DISPENSING ROTOR FOR USE IN APPARATUS

[75] Inventors: Richard Keenan; John Keenan; Richard Christopher Moore; James English, all of Bagenalstown, Ireland

[73] Assignee: Vetron Holdings Limited, Bagenalstwon, County Carlow, Ireland

[21] Appl. No.: 718,435
[22] PCT Filed: Mar. 29, 1995
[86] PCT No.: PCT/IE95/00023
 § 371 Date: Sep. 30, 1996
 § 102(e) Date: Sep. 30, 1996
[87] PCT Pub. No.: WO95/26129
 PCT Pub. Date: Oct. 5, 1995

[30] Foreign Application Priority Data

Mar. 29, 1994 [IE] Ireland ................................ S940270
Dec. 30, 1994 [IE] Ireland ................................ S941008

[51] Int. Cl.⁶ .................................................. A21C 19/02
[52] U.S. Cl. ........................... 239/676; 239/683; 239/687
[58] Field of Search .................................. 239/650, 662, 239/665, 667, 670, 672, 676, 677, 681, 683–685, 687

[56] References Cited

U.S. PATENT DOCUMENTS 3,785,573  1/1974  Crawford ........................... 239/681 X
4,002,272  1/1977  Crawford et al. .................. 239/677 X
5,671,891  9/1997  Keenan et al. ..................... 239/676

FOREIGN PATENT DOCUMENTS

467001     1/1968  Switzerland .
467 001    2/1969  Switzerland .
1 205 135  9/1970  United Kingdom .
2 177 937  2/1987  United Kingdom .
2178287    2/1987  United Kingdom ................ 239/681
WO94/15449 7/1994  WIPO .

*Primary Examiner*—Lesley D. Morris
*Attorney, Agent, or Firm*—Sixbey, Friedman, Leedom & Ferguson; Frank P. Presta; Joseph S. Presta

[57] ABSTRACT

A spreader wagon (1) comprises a container (10). A dispensing rotor (30) is rotatable in the container (10) for dispensing material through a dispensing outlet (21). A piston plate member (45) is movable within the container (10) for urging material into engagement with the dispensing rotor (30). An inner separating member (75) and an outer separating member (76) are rotatably mounted on the dispensing rotor (30) for separating material from the mass of material in the container (10) for dispensing through the dispensing outlet (21). A drive transmission interconnects the dispensing rotor (30) and the inner and outer separating members (75,76) so that the separating members (75,76) rotate relative to the dispensing rotor (30) as the dispensing rotor (30) rotates.

21 Claims, 11 Drawing Sheets

APPARATUS FOR SPREADING MATERIAL AND A DISPENSING ROTOR FOR USE IN APPARATUS

The present invention relates to apparatus for spreading material, and in particular, though not limited to apparatus for spreading animal fodder, manure, slurry and the like.

Such apparatus is commonly used for agricultural purposes, for example, for spreading fodder or manure. Generally speaking, these type of apparatus are referred to as spreader wagons. In general, such spreader wagons comprise an elongated container and a dispensing rotor rotatably mounted at one end thereof for discharging material from the container through the dispensing outlet. A piston plate is movable with rectilinear movement along and through the container for urging material in the container towards the dispensing rotor. Typical spreader wagons are described and illustrated in British Patent Specifications Nos. GB-B-1,205,135 and GB-A-2,177,937 and PCT Specification No. PCT-A-WO94/15449.

A problem with known spreader wagons arises when the material to be dispensed includes a fibrous material, such as, for example, hay, straw, long cut silage and the like, and in particular, when the fibrous material is entrained in a viscous slurry type material. In such cases, the dispensing rotor may fail to separate material for dispensing from the mass of material in the container due to the mass of material in the container becoming compacted. While this problem is partly overcome by the spreader wagon disclosed in PCT Specification No. PCT-A-WO94/15449, nonetheless, in certain cases, problems may arise in dispensing certain materials which comprise a mass of fibrous material entrained in a viscous slurry type material, for example, a mixture of animal manure and bedding straw. In such cases, the mass of material in the container facing the dispensing rotor tends to take up the profile of the face of the dispensing rotor which faces the mass of material, and in general, no amount of normal pressure being exerted on the mass of material for urging the mass of material into engagement with the dispensing rotor is sufficient for enabling the dispensing rotor to rip and separate material for dispensing from the mass of material. Similar problems may arise in the case of animal feed where the animal feed contains a mixture which comprises a considerable quantity of fibrous material such as silage or hay mixed with a relatively viscous wet slurry type material.

There is therefore a need for a spreader wagon, and for apparatus for spreading material, and in particular, for spreading material from a mass of moist fibrous viscous slurry type material which overcomes these problems.

The present invention is directed towards providing such apparatus.

According to the invention there is provided apparatus for spreading material, the apparatus comprising an elongated container for the material extending from an upstream end to a downstream end and defining a longitudinally extending central axis, a dispensing outlet from the container being located adjacent the downstream end thereof, a dispensing rotor mounted in the container adjacent the downstream end, and being rotatable about a main rotational axis which extends parallel to the central axis of the container for dispensing material from the container through the dispensing outlet, and a separating means mounted on the dispensing rotor for separating material for dispensing by the dispensing rotor from the mass of material in the container, wherein the separating means is rotatably mounted on the dispensing rotor about a secondary rotational axis, and is rotatable relative to the dispensing rotor.

The advantages of the invention are many. By virtue of the fact that the separating means is rotatably mounted on the dispensing rotor and is rotatable relative to the dispensing rotor, the combined effect of the dispensing rotor rotating in the container and the separating means rotating relative to the dispensing rotor while the dispensing rotor is rotating greatly facilitates separation of material from the mass of material in the container, which can then be readily easily dispensed through the dispensing outlet by the dispensing rotor. The fact that the separating means is rotatable relative to the dispensing rotor is particularly advantageous where the material in the container is a wet viscous slurry type material having fibrous material entrained therethrough, such as, for example, animal manure with straw bedding. Such material can readily easily become compacted and caked within the container, and it has been found that the rotatable separating means is particularly suitable for separating material for dispensing from such caked fibrous material. The rotatable separating means rips through the caked mass as the dispensing rotor rotates thereby detaching material from the caked mass for dispensing.

Preferably, the secondary rotational axis of the separating means extends parallel to the main rotational axis of the dispensing rotor. Advantageously, the secondary rotational axis of the separating means is offset from the main rotational axis of the dispensing rotor.

Preferably, the separating means comprises a separating arm extending transversely from and to one side of the secondary rotational axis. Advantageously, a pair of separating arms are provided extending on respective opposite sides of the secondary rotational axis. Ideally, each separating arm extends radially relative to the secondary rotational axis. In one aspect of the invention a leading edge of each separating arm acts as a cutting edge for separating the material to be dispensed from the mass of material in the container.

A particularly important advantage is achieved by the invention when the separating means is provided by one or more separating arms extending transversely or radially from the secondary rotational axis of the separating means. The separating arms are particularly suitable for ripping material from a caked mass with fibrous material entrained therethrough.

In one aspect of the invention the separating means comprises a separating disc.

Preferably, each separating means comprises a cutting means for cutting material from the mass of material in the container. Advantageously, the separating means is rotatable in a plane parallel to the plane of rotation of the dispensing rotor, and ideally, is rotatable substantially in its own plane.

In one aspect of the invention a main drive transmission means is provided for transmitting drive to the dispensing rotor for rotation thereof, and a secondary drive transmission means is provided for transmitting drive to the separating means for rotation thereof, the main and secondary drive transmission means being interconnected with each other so that the rotational speed of the separating means is a function of the rotational speed of the dispensing rotor.

Advantageously, the main drive transmission means comprises a main drive shaft co-axial with the main rotational axis and extending rigidly from the dispensing rotor for rotating the dispensing rotor, the main drive shaft being rotatably mounted in the container, and the secondary drive transmission means comprises a secondary drive shaft co-axial with the secondary rotational axis of the separating means and rigidly connected thereto, the secondary drive shaft being rotatably mounted in the dispensing rotor, and the secondary drive transmission means further comprising a first drive transmission element and a second drive transmission element, the first drive transmission element being co-axially mounted with the main drive shaft, and the second drive transmission elements being rigidly and co-axially mounted on the secondary drive shaft so that on rotation of the dispensing rotor by the main drive shaft, the first and second drive transmission elements co-operate for rotating the separating means. Preferably, the first drive transmission element is a stationary gear mounted on the container and extending co-axially with and around the main drive shaft. Advantageously, the stationary gear comprises internal and external gear teeth extending around the stationary gear for engaging respective second drive transmission elements of respective separating means.

In another aspect of the invention the separating means is rotated in a rotational direction opposite to the rotational direction in which the dispensing rotor is rotated.

Rotating at least one of the separating means in a rotational direction opposite to the direction of rotation of the dispensing rotor further facilitates and enhances the ripping action of the separating means from the mass of material in the container for ripping material from the mass of material in the container for dispensing through the dispensing outlet.

In another aspect of the invention the separating means is rotated in a rotational direction similar to the rotational direction in which the dispensing rotor is rotated. Preferably, a pair of separating means is mounting on the dispensing rotor, the secondary rotational axes defined by the respective separating means being spaced apart from each other.

Advantageously, the secondary rotational axes extend parallel to each other, and the secondary rotational axes and the main rotational axis lie in a common plane.

Ideally, the respective separating means rotate in directions opposite to each other.

In one aspect of the invention the secondary rotational axis of one of the separating means is closer to the main rotational axis than the secondary rotational axis of the other separating means. Preferably, the separating means closest to the main rotational axis rotates in the opposite rotational direction to that of the dispensing rotor.

In another aspect of the invention each separating means rotates at a rotational speed of up to ten times faster than the rotational speed of the dispensing rotor. Preferably, each separating means rotates at a speed in the range of one and a half times to five times faster than the rotational speed of the dispensing rotor. Advantageously, each separating means rotates at a speed of approximately two and a half times faster than the rotational speed of the dispensing rotor.

By rotating each separating means at a higher rotational speed than the rotational speed of the dispensing rotor, the separating means are particularly effective in ripping material from the mass of material in the container for dispensing through the dispensing outlet.

Ideally, the dispensing rotor defines an upstream facing surface facing in a generally upstream direction, each separating means being located adjacent the upstream facing surface, and the upstream facing surface being free of projections for preventing snagging of material on the dispensing rotor between each separating means and the upstream facing surface. Preferably, each separating means is rotatable in a plane parallel to the upstream facing surface.

In one aspect of the invention the dispensing rotor comprises a main rotor disc of circular shape, the geometrical center of the main rotor disc coinciding with the main rotational axis.

In another aspect of the invention a plurality of dispensing ribs are mounted on the main rotor disc and extend from the main rotor disc in an upstream direction and in a generally radial direction for dispensing material through the dispensing outlet, the dispensing ribs being spaced apart circumferentially around the main rotor disc. Preferably, the dispensing ribs are equi-spaced circumferentially around the main rotor disc.

In another aspect of the invention a secondary rotor disc is connected to the main rotor disc, the secondary rotor disc extending parallel to the main rotor disc, and being located intermediate the main rotor disc and the separating means, the secondary rotor disc defining the upstream facing surface. Preferably, the secondary rotor disc is of circular shape. Advantageously, the diameter of the secondary rotor disc is less than the diameter of the main rotor disc, and the dispensing ribs extend from the secondary rotor disc.

In another aspect of the invention the dispensing ribs extend between the main and secondary rotor discs.

Ideally, a peripheral spacer band extends around the secondary rotor disc and extends between the secondary rotor disc and the main rotor disc for rigidly securing the main and secondary discs together, the dispensing ribs extending radially from the peripheral spacer band.

Preferably, each dispensing rib terminates at a radial position corresponding to the outer periphery of the main rotor disc.

In a further aspect of the invention a dispensing member is pivotally mounted on the dispensing rotor for ripping material from the mass of material in the container and dispensing the material through the dispensing outlet. Preferably, the dispensing member is mounted on a periphery of the dispensing rotor, and extends generally radially outwardly therefrom. Advantageously, a plurality of dispensing members are provided spaced apart circumferentially around the dispensing rotor.

In one aspect of the invention an urging means for urging the material in the container towards the dispensing rotor is provided.

In another aspect of the invention an isolating means extends transversely of the central axis and is located in the container adjacent the downstream end and upstream of the dispensing rotor, the isolating means being movable between a closed position for isolating the dispensing rotor from a portion of the container which is upstream of the isolating means to an open position whereby the dispensing rotor communicates with the upstream portion of the container.

In a further aspect of the invention the container comprises a base of semi-circular cross-section having an axis of generation which coincides with the central axis of the container, and a pair of spaced apart side walls extending generally upwardly from the base and between the upstream and downstream ends, and a downstream end wall extending upwardly from the base between the side walls. Preferably, the main drive shaft is rotatable in the end wall.

Additionally, the invention provides a dispensing rotor for apparatus for spreading material, the dispensing rotor comprising a means for rotatably mounting the dispensing rotor in the apparatus for dispensing material from the apparatus through a dispensing outlet therefrom, and a separating means being mounted on the dispensing rotor for separating material from the mass of material in the container, wherein the separating means is rotatably mounted on the dispensing rotor about a secondary rotational axis, and is rotatable relative to the dispensing rotor.

The invention will be more clearly understood from the following description of some preferred embodiments thereof which are given by way of example only, with reference to the accompanying drawings, in which:

FIG. 14 is a cut away perspective view of the dispensing rotor of FIG. 13, and FIG. 15. is a cross-sectional view of a detail of the dispensing rotor of FIG. 13.

Referring to drawings and initially to FIGS. 1 to 11 there is illustrated apparatus, in this case, a spreader wagon according to the invention indicated generally by the reference numeral 1 for spreading material, typically, animal fodder, manure, slurry and the like. The spreader wagon 1 is suitable for hitching to a tractor or other towing vehicle (not shown), and is particularly suitable for spreading wet viscous fibrous materials such as, for example, moist animal fodder which includes hay, straw, silage and the like entrained therethrough, or indeed, manure which has bedding straw entrained therethrough.

Figure 1:
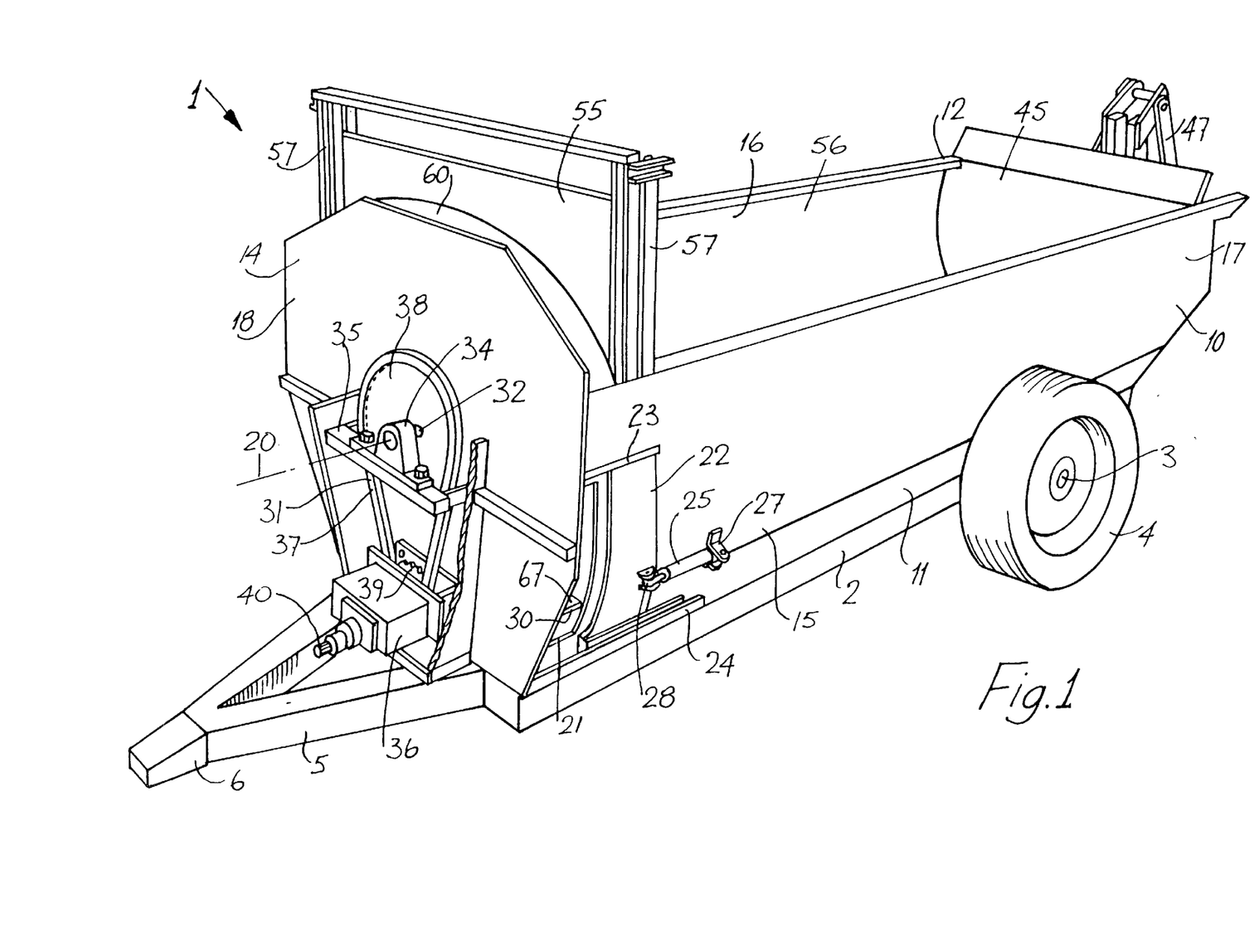
FIG. 1 is a perspective view of a spreader wagon according to the invention.
Figure 2:
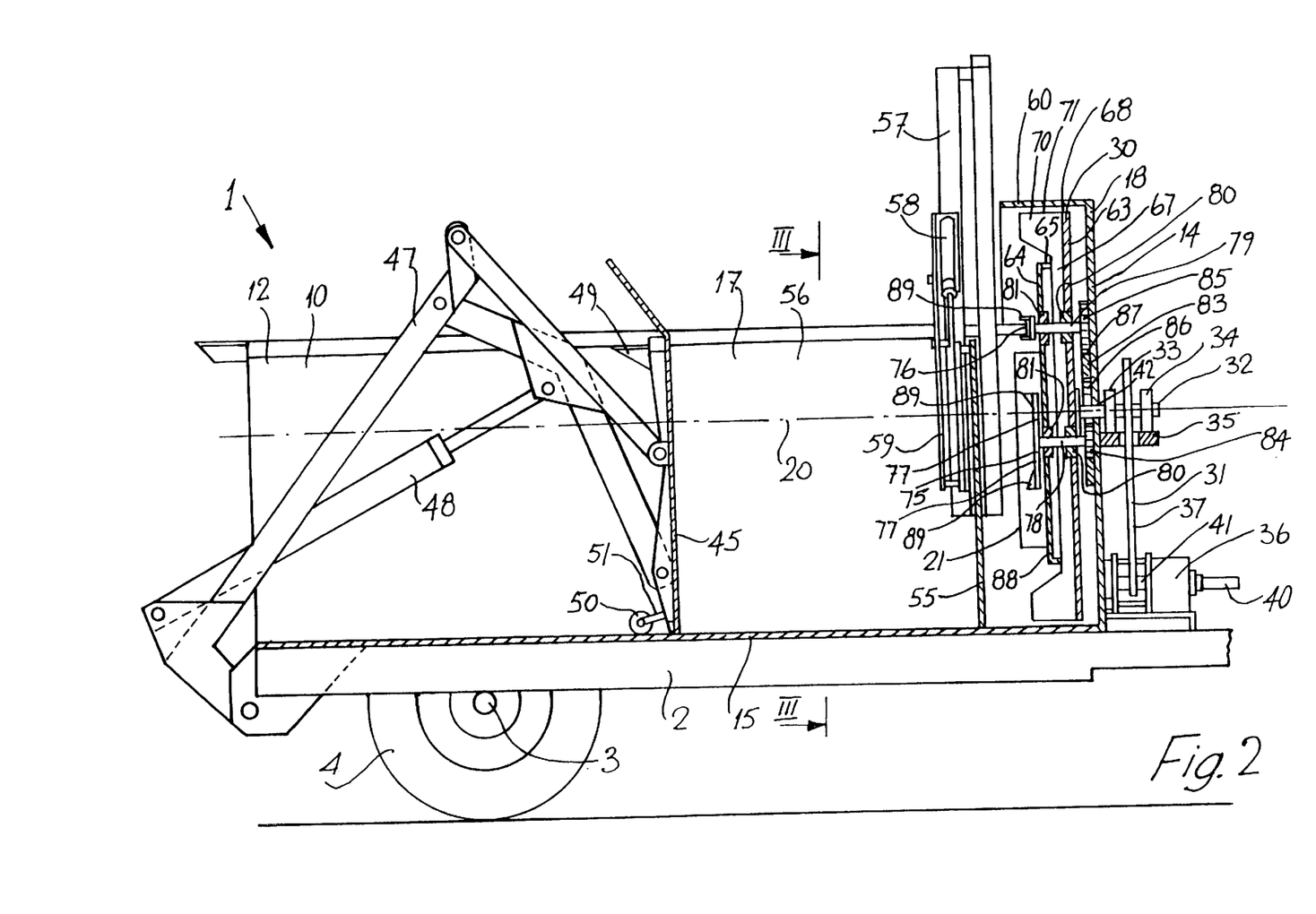
FIG. 2 is a cross-sectional side elevational view of the spreader wagon of FIG. 1.
Figure 3:
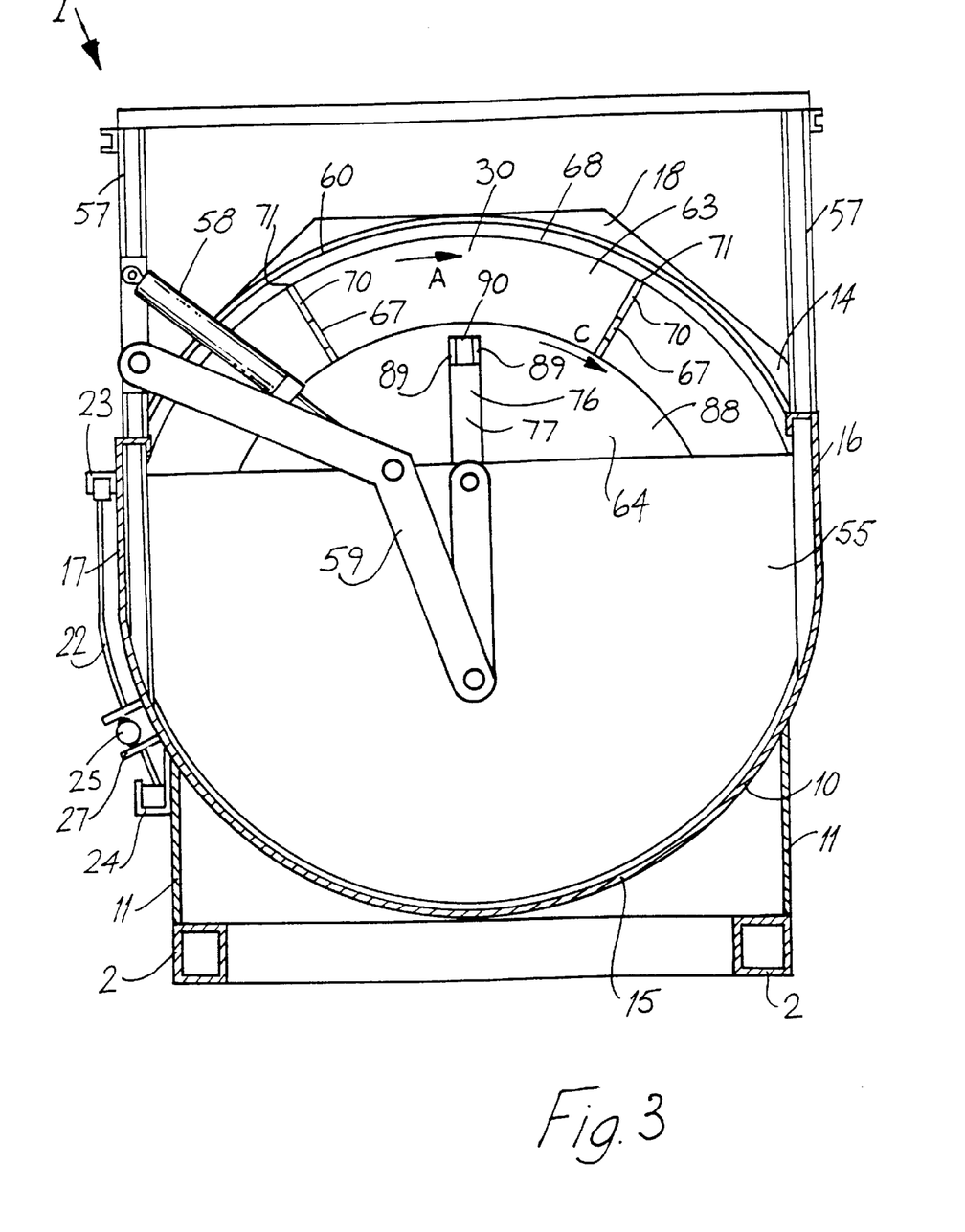
FIG. 3 is a transverse cross-sectional view of the spreader wagon of FIG. 1 on the line III—III of FIG. 2.
Figure 4:
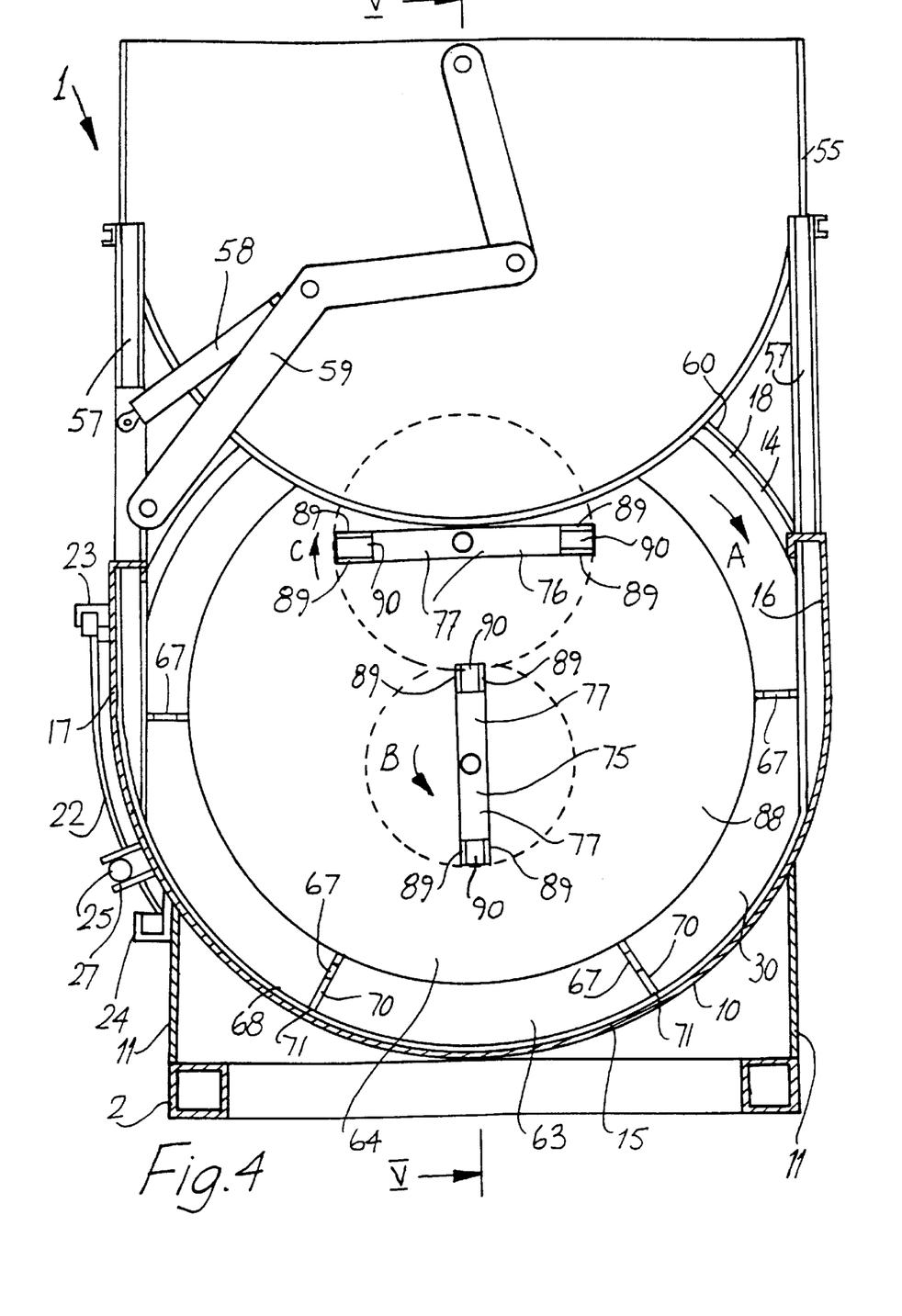
FIG. 4 is a transverse cross-sectional view similar to FIG. 3 of the spreader wagon of FIG. 1 showing a portion of the spreader wagon in a different position.

The spreader wagon 1 comprises a chassis 2 supported on an axle 3 which rotatably carries a pair of ground engaging wheels 4. Forwardly extending members 5 extend from the chassis 2 and terminate in a tow hitch 6 for hitching the wagon 1 to the tractor or other towing vehicle. An elongated container 10 for the fodder, manure or the like is carried on the chassis 2 by a pair of side plate members 11 which extend downwardly from the container 10 to the chassis 2. The container 10 extends from an upstream end 12 to a downstream end 14, and comprises a base 15 of semi-circular cross-section, in other words, of semi-cylindrical construction, and a pair of spaced apart side walls 16 and 17 extending upwardly from the base 15. A downstream end wall 18 extends upwardly from the base 15 and between the side walls 16 and 17 at the downstream end 14 of the container 10. The base 15, side walls 16 and 17 and the end wall 18 are of steel plate material. The base 15 defines an axis of generation which coincides with and forms a longitudinally extending central axis 20 of the container 10.

A dispensing outlet 21 through which material from the container 10 is discharged is provided at the downstream end 14 of the container 10. The dispensing outlet 21 is formed by an elongated slot in the side wall 17 and the base 15 adjacent the end wall 18 A closure plate 22 of steel plate material slidable in upper and lower tracks 23 and 24, respectively, selectively closes the dispensing outlet 21. An hydraulic ram 25 pivotally connected to the base 15 and the closure plate 22 by brackets 27 and 28, respectively, slides the closure plate 22 in the tracks 23 and 24 between an open position with the dispensing outlet 21 open and a closed position with the dispensing outlet 21 closed.

Figure 5:
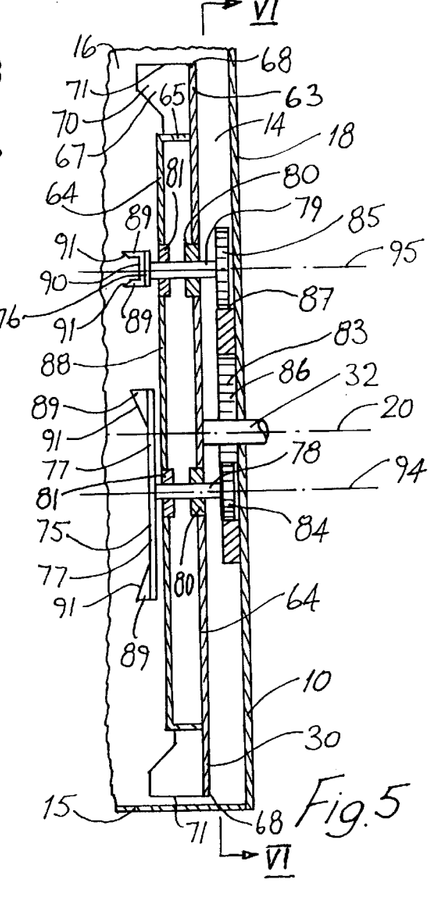
FIG. 5 is a cross-sectional side elevational view of a portion of the spreader wagon of FIG. 1 on the line V—V of FIG. 4.
Figure 6:
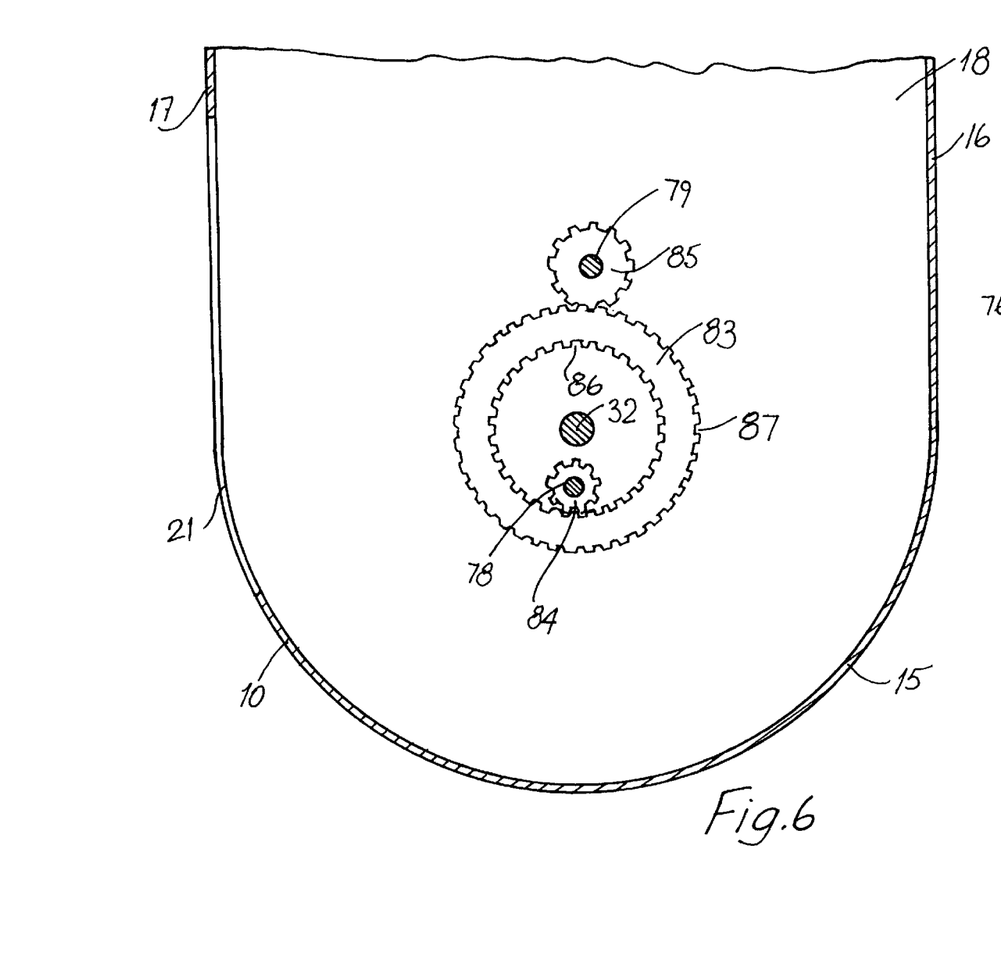
FIG. 6 is a cross-sectional end elevational view of portion of the wagon of FIG. 1 on the line VI—VI of FIG. 5.

A dispensing rotor 30 also according to the invention is mounted within the container 10 adjacent the downstream end 14 and is rotatable in the direction of the arrow A for dispensing material from the container 10 through the dispensing outlet 21. A main drive transmission means, namely, a main drive shaft 32 extends rigidly from the dispensing rotor 30 and carries the dispensing rotor 30 within the container 10. The main drive shaft 32 extends through an opening 42 in the end wall 18 and is rotatably carried in bearings 33 and 34 which are mounted on a support framework 35, which is in turn carried on the end wall 18. The main drive transmission means also comprises a gear box 36 which is mounted on the chassis 2 and a chain and sprocket drive 31 which transmits drive from the gear box 36 to the main drive shaft 32. The chain and sprocket drive 31 comprises a drive chain 37 and sprockets 38 and 39 mounted on the main drive shaft 32 and an output drive shaft 41 from the gear box 36, respectively. A splined input shaft 40 receives drive from a power take-off-shaft (not shown) of a tractor (also not shown) through a connecting drive shaft (also not shown) for driving the dispensing rotor 30 in the direction of the arrow A. The connection of the splined input shaft 40 to the power take-off-shaft of a tractor will be well known to those skilled in the art. The dispensing rotor 30 is described in more detail below.

An urging means for urging material in a generally downstream direction in the container 10 towards the dispensing rotor 30 comprises a piston plate member 45 located in the container 10 and extending transversely of the container 10. The piston plate member 45 is vertically disposed and is slidable longitudinally within the container 10 with rectilinear motion from the upstream end 12 to the downstream end 14 for urging the material in the container 10 into engagement with the dispensing rotor 30. The piston plate member 45 is of steel plate material, and the peripheral edge of the piston plate member 45 substantially defines the transverse cross-section of the container 10 so that the piston plate member 45 also acts to retain material in the container 10. A seal (not shown) extends around the peripheral edge of the piston plate member 45 for slidably sealing the piston plate member 45 against the base 15 and the side walls 16 and 17 in the container 10.

A drive linkage mechanism 47 which is connected between the piston plate member 45 and the chassis 2 mounts the piston plate member 45 in the container 10 and constrains the piston plate member 45 to move with the rectilinear motion. A double acting hydraulic ram 48 acting between linkages of the drive linkage mechanism 47 drives the piston plate member 45 between the upstream end 12 and the downstream end 14 of the container 10. A pair of skids 49 extending from the piston plate member 45 and a pair of rollers 50 carried on brackets 51 also extending from the piston plate member 45 engage the container 10 for also constraining the piston plate member 45 to move with the rectilinear motion. Only one skid plate 49 and one roller 50 are illustrated. The piston plate member 45 and the drive linkage mechanism 47 is substantially similar to that of the spreader wagon which is described in Specification No. PCT-A-WO94/15449, and accordingly, it is not intended to describe this aspect of the spreader wagon 1 in further detail here.

An isolating means comprising an isolating plate 55 of steel plate material is located in the container 10 adjacent the downstream end 14 on the upstream side of the dispensing rotor 30 for selectively isolating the dispensing rotor 30 from a portion 56 of the container 10 upstream of the isolating plate 55 for allowing the dispensing rotor 30 to be run up to its operating speed before coming into contact with the material in the container 10. The isolating plate 55 is slidable in a pair of guide tracks 57 extending upwardly from the side walls 16 and 17 from a lower closed position illustrated in FIG. 3 isolating the dispensing rotor 30 from the upstream portion 56 to an upper open position illustrated in FIG. 4 communicating the dispensing rotor 30 with the upstream portion 56. A double acting hydraulic ram 58 mounted on one of the guide tracks 57 drives the isolating plate 55 through a drive linkage 59 between the lower closed and upper open positions. The isolating plate 55 and its operation is substantially similar to an isolating plate of the spreader wagon disclosed in Specification No. PCT-A-WO94/15449, and accordingly, this aspect of the spreader wagon 1 will not be described in further detail.

A cowling 60 of arcuate shape extending from the end wall 18 and between the side walls 16 and 17 over the dispensing rotor 30 towards the isolating plate 55 prevents the dispensing rotor 30 dispensing material over the side wall 16 and 17.

Returning now to the dispensing rotor 30, the dispensing rotor 30 comprises a main rotor disc 63 and a secondary rotor disc 64 which are spaced apart and parallel to each other and joined together by a spacer band 65 which extends around the periphery of the secondary rotor disc 64. The main rotor disc 63, the secondary rotor disc 64 and the spacer band 65 are all of steel plate material and are welded together. The main rotor disc 63 and the secondary rotor disc 64 are circular, and their respective geometric centres are co-axial. The main rotor disc 63 is rigidly mounted on the main drive shaft 32, and is thereby carried by the main drive shaft 32. The geometric axis of the main and secondary rotor disc 63 and 64 coincide with the rotational axis of the main drive shaft 32, and the main drive shaft 32 is carried in the bearings 33 and 34 so that the rotational axis of the main drive shaft 32 coincides with the central axis 20 of the container 10. Accordingly, the main rotor disc 63 and secondary rotor disc 64 are co-axial with the axis of generation of the base 15 of the container 10.

Six dispensing ribs 67 of steel plate material are welded to the main rotor disc 63 for dispensing material through the dispensing outlet 21. The dispensing ribs 67 extend radially from adjacent the rotational axis of the dispensing rotor 30 to a position adjacent the peripheral edge 68 of the main rotor disc 63. Slots 69 in the spacer band 65 accommodate the dispensing ribs 67 through the spanner band 65. The dispensing ribs 67 are equi-spaced at 60° intervals circumferentially around the main rotor disc 63. The radius of the main rotor disc 63 is approximately 8 mm to 15 mm less than the internal radius of the base 15, and the clearance between peripheral ends 71 of the dispensing rib 67 and the base 15 is approximately 8 mm to 15 mm so that the main rotor disc 63 and the dispensing ribs 67 co-operate with the base 15 for dispensing material through the dispensing outlet 21. The dispensing ribs 67 have relatively wide portions 70 adjacent their peripheral ends 71 extending in an upstream direction from the main rotor disc 63 for engaging material in the container 10 for separating some of the material from the mass of material in the container 10 and for dispensing the material through the outlet 21.

Figure 7:
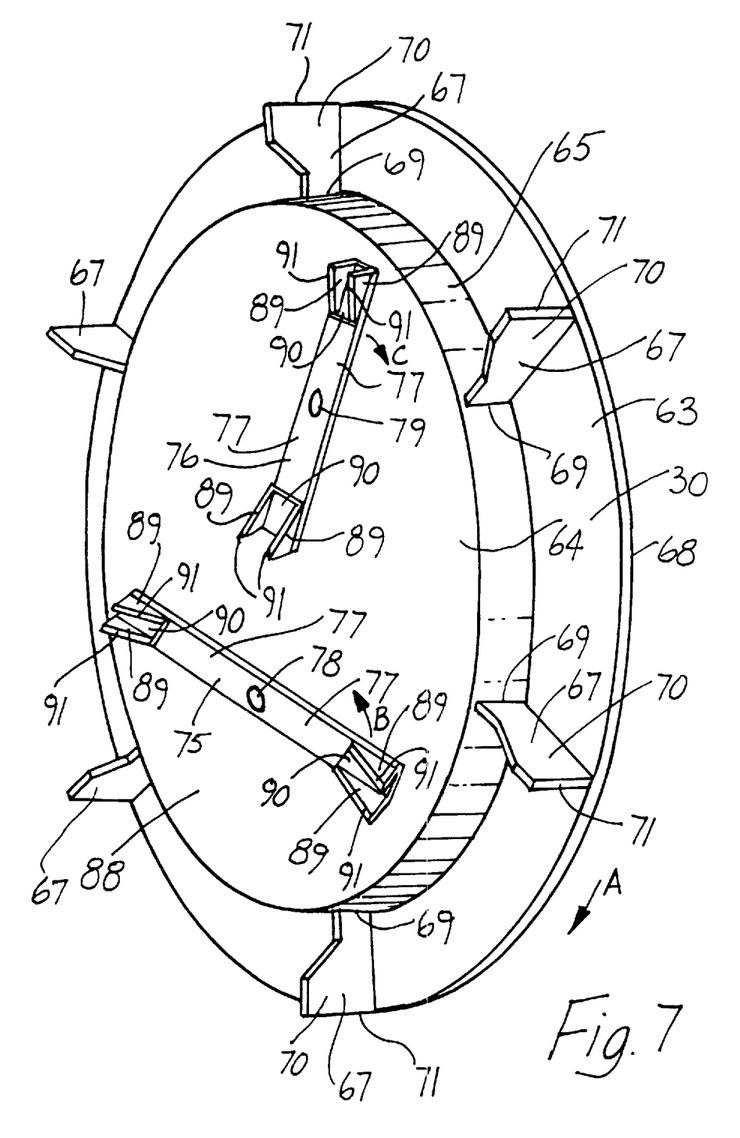
FIG. 7 is a perspective view of a dispensing rotor of the wagon of FIG. 1 also according to the invention.
Figure 9:
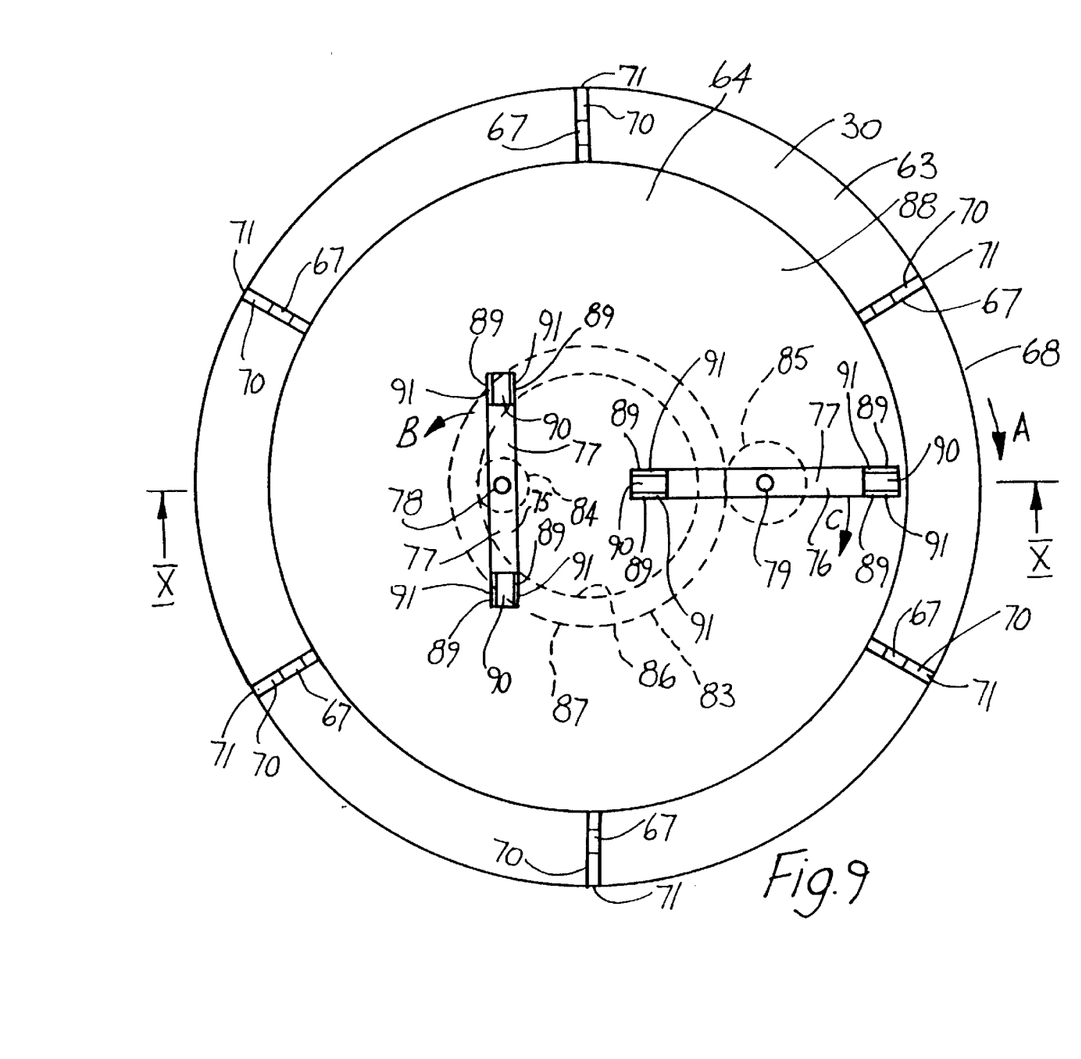
FIG. 9 is an elevational view of the dispensing rotor of FIG. 7.
Figure 10:
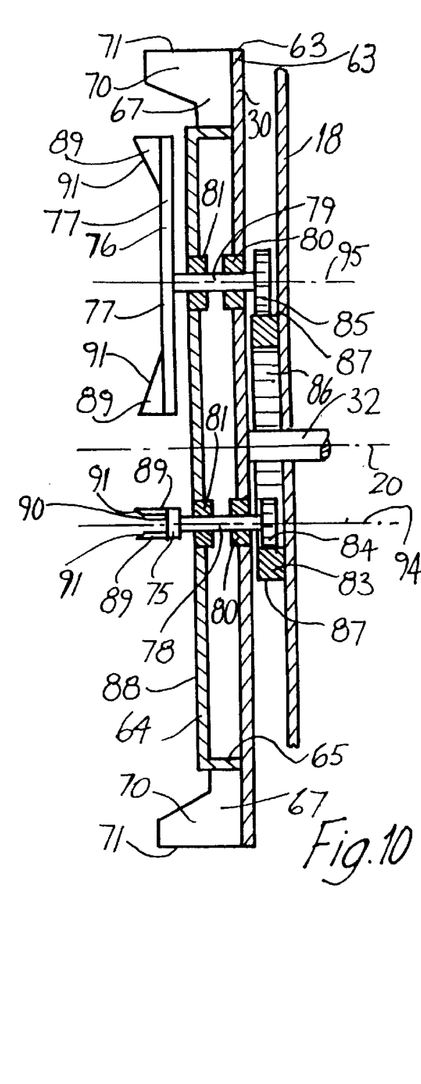
FIG. 10 is a sectional side elevational view of the dispensing rotor of FIG. 7 on the line X—X of FIG. 9.

A pair of separating means for separating and ripping material from the mass of material in the container 10 for discharge through the dispensing outlet 21 comprises a pair of elongated separating members of steel, namely, an inner separating member 75 and an outer separating member 76 both of which are rotatably carried on the dispensing rotor 30. Each separating member 75 and 76 forms a pair of transverse separating arms 77 which extend rigidly and radially from respective inner and outer secondary drive shafts 78 and 79. Each secondary drive shaft 78 and 79 is rotatably carried in bearings 80 and 81 which are located in the main rotor disc 63 and the secondary rotor disc 64, respectively.

Figure 8:
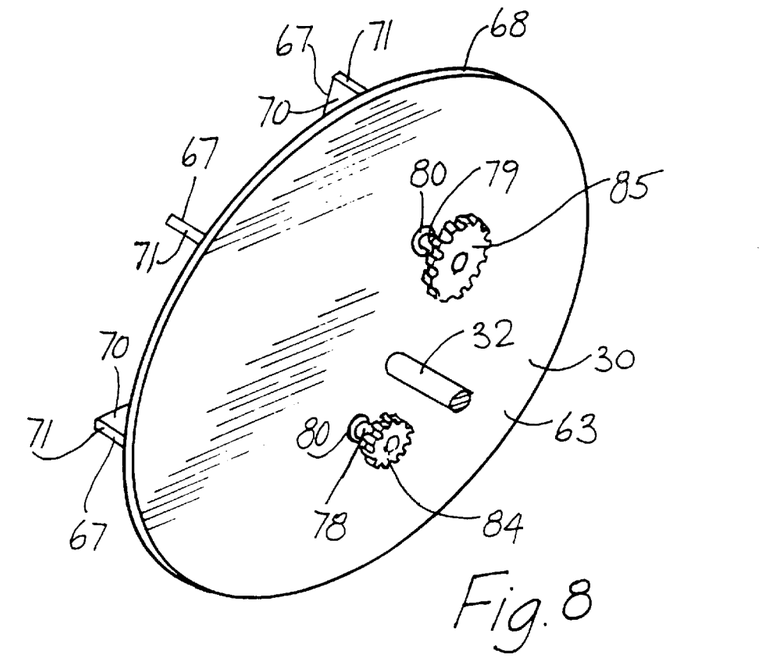
FIG. 8 is a perspective view showing the dispensing rotor of FIG. 7 from a different direction.

A secondary drive transmission means for rotating the respective inner and outer separating members 75 and 76 relative to the dispensing rotor 30 as the dispensing rotor 30 rotates comprises first and second drive transmission elements. The first drive transmission element comprises a stationary ring gear 83 having inner and outer gear teeth 84 and 85, respectively, and which is rigidly mounted on the end wall 18. The second drive transmission elements comprise respective pinions 84 and 85 which are rigidly mounted on the inner and outer secondary drive shaft 78 and 79, respectively. The pinions 84 and 85 co-operate with the inner and outer gear teeth 86 and 87, respectively, on the stationary ring gear 83, so that as the dispensing rotor 30 rotates in the direction of the arrow A, the pinions 84 and 85 are rotated and, in turn cause the inner separating member 75 to rotate in an opposite rotational direction, namely, in the direction of the arrow B, to that of the dispensing rotor 30, and the outer separating member 76 to rotate in a similar rotational direction, namely, the direction of the arrow C to the rotational direction of the dispensing rotor 30. Accordingly, the secondary drive transmission means is interconnected with the main drive transmission means so that rotation of the dispensing rotor 30 rotates the inner and outer separating members 75 and 76.

The secondary outer disc 64 defines a plain upstream facing surface 88 which faces in a generally upstream direction adjacent the inner and outer separating members 75 and 76, respectively. The upstream facing surface 88 extends to cover the area swept by the inner and outer separating member 75 and 76 for preventing any danger of material ripped from the mass of material in the container 10 by the separating member 75 and 76 snagging on the dispensing rotor 30.

In this embodiment of the invention the inner and outer secondary drive shafts 78 and 79, define inner and outer secondary rotational axes 94 and 95, respectively, which are parallel to each other and in turn are parallel to the central axis 20. The rotational axes 94 and 95 of the secondary drive shafts 78 and 79 lie in a plane which also contains the central axis 18, and in turn, the rotational axis of the dispensing rotor 30. The rotational axis 94 of the inner secondary drive shaft 78 is closer to the central axis 20 than the secondary rotational axis 95 of the secondary drive shaft 79. The gear ratio of the ring gear 83 and the pinions 84 and 85 are chosen so that the inner and outer separating members 75 and 76, respectively, rotate at approximately two and half times the speed of the dispensing rotor 30. In this embodiment of the invention it is recommended that the dispensing rotor 30 should be rotated at a speed of approximately 150 rpm, and thus, the inner and outer separating member 75 and 76 each rotate at a speed of approximately 375 rpm.

A pair of cutting means, namely, a pair of cutting blades 89 extending from a mounting plate 90 are secured to the free ends of the inner and outer separating members 75 and 76 for engaging and ripping material from the mass of material in the container 10. The cutting blades 89 are of triangular shape with cutting edges 91 extending substantially longitudinally relative to the respective inner and outer separating members 75 and 76, and in a generally upstream direction towards the free ends of the separating members 75 and 76.

Seals (not shown) are provided for sealing between the inner and outer secondary drive shaft 78 and 79 and the main and secondary rotor disc 63 and 64, respectively, to prevent ingress of material into the bearings 80 and 81. Seals (also not shown) are provided between the end wall 18 and the main drive shaft 32 to prevent loss of material from the container 10.

Figure 11:
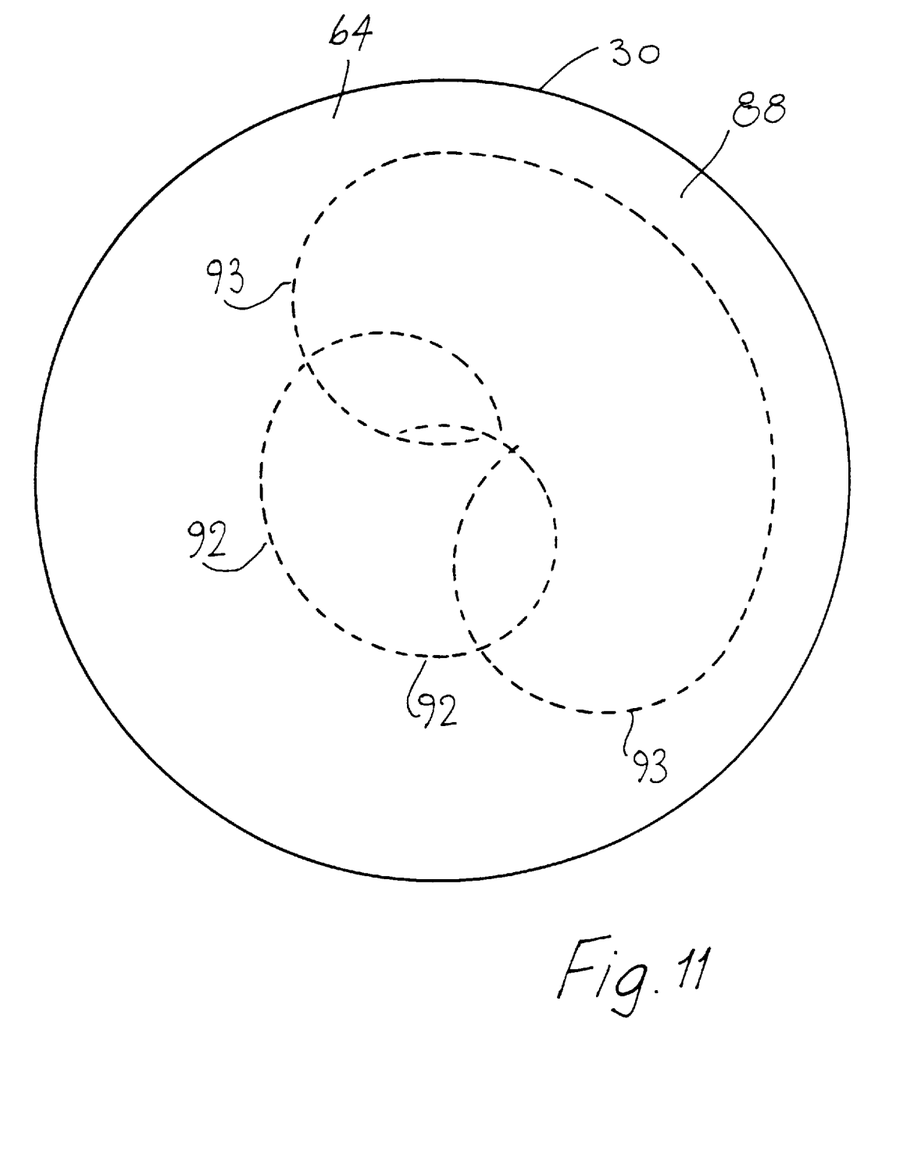
FIG. 11 is a diagrammatic view of the dispensing rotor of FIG. 7.

Referring now to FIG. 11 the locus of one of the one of the outer free ends of the inner and outer separating members 75 and 76 is illustrated and indicated by the broken lines 92 and 93, respectively, for part of a revolution of the dispensing rotor 30.

In use, the spreader wagon 1 is coupled to a tractor or other suitable towing vehicle. The power take-off-shaft of the tractor is connected to the splined input shaft 40 for rotating the dispensing rotor 30 in the direction of the arrow A, and in turn, the inner and outer separating members 75 and 76, respectively, in the direction of the arrows B and C, respectively. An hydraulic power supply of the tractor is coupled to an hydraulic circuit (not shown) of the spreader wagon 1 for powering and operating the drive rams 25, 48 and 58. The piston plate member 45 is withdrawn to the upstream end 12 of the container 10, and the isolating plate 55 is lowered into the closed position. The container 10 is loaded with the material to be dispensed.

When it is desired to dispense the material from the container 10, the closure plate 22 is moved into the open position by the ram 25, and the dispensing rotor 30 is rotated and run up to its dispensing operating speed of approximately 150 rpm, thereby rotating the separating members 75 and 76 at 375 rpm. The isolating plate 55 is then raised into the upper open position, and pressure is applied to the piston plate member 45 by the ram 48 for urging the material in the container 10 towards the dispensing rotor 30. The rotational action of the inner and outer separating members 75 and 76 on the mass of material in the container 10 rips and separates material from the mass of material which is then dispensed by the dispensing rotor 30 through the dispensing outlet 21. Sufficient pressure is continuously applied to the piston plate member 45 by the ram 48 to continuously urge the material in the container 10 into engagement with the dispensing rotor 30.

On all the material having been dispensed from the container 10 the piston plate member 45 is urged in the upstream direction to the upstream end 12 by the drive ram 48. The isolating plate 55 is lowered into the closed position and the container 10 is ready to receive the next load of material for spreading.

Figure 12:
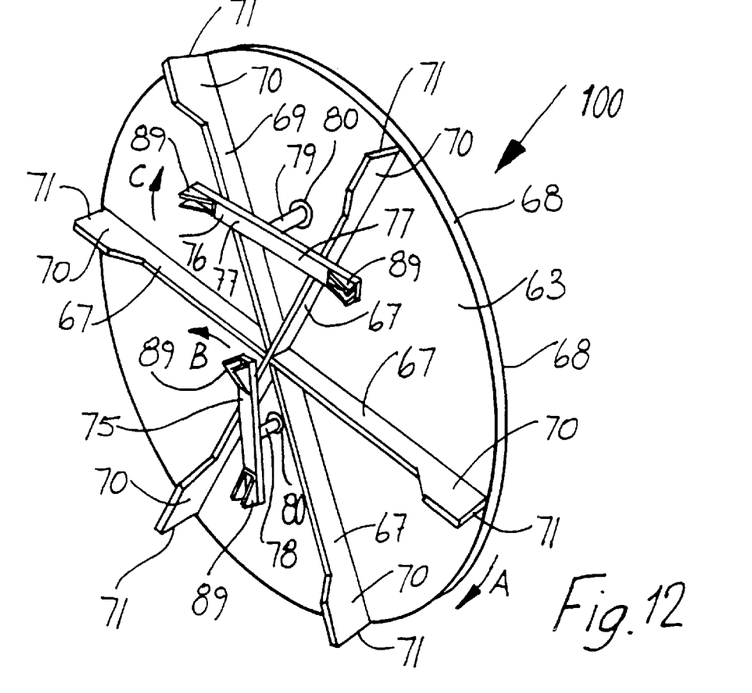
FIG. 12 is a perspective view of a dispensing rotor according to another embodiment of the invention for use in the spreader wagon of FIG. 1.

Referring now to FIG. 12 there is illustrated a dispensing rotor according to another embodiment of the invention indicated generally by the reference numeral 100 for use in the spreader wagon 1 of FIGS. 1 to 11. The dispensing rotor 100 is substantially similar to the dispensing rotor 30 described with reference to FIGS. 1 to 11, and similar components are identified by the same reference numerals.

The main difference between the dispensing rotor 100 and the dispensing rotor 30 is that the secondary rotor disc 64 and the spacer band 65 have been omitted. Otherwise, this dispensing rotor 110 is similar to the dispensing rotor 30, and its mounting and use in the container 10 is similar to that already described.

Figure 13:
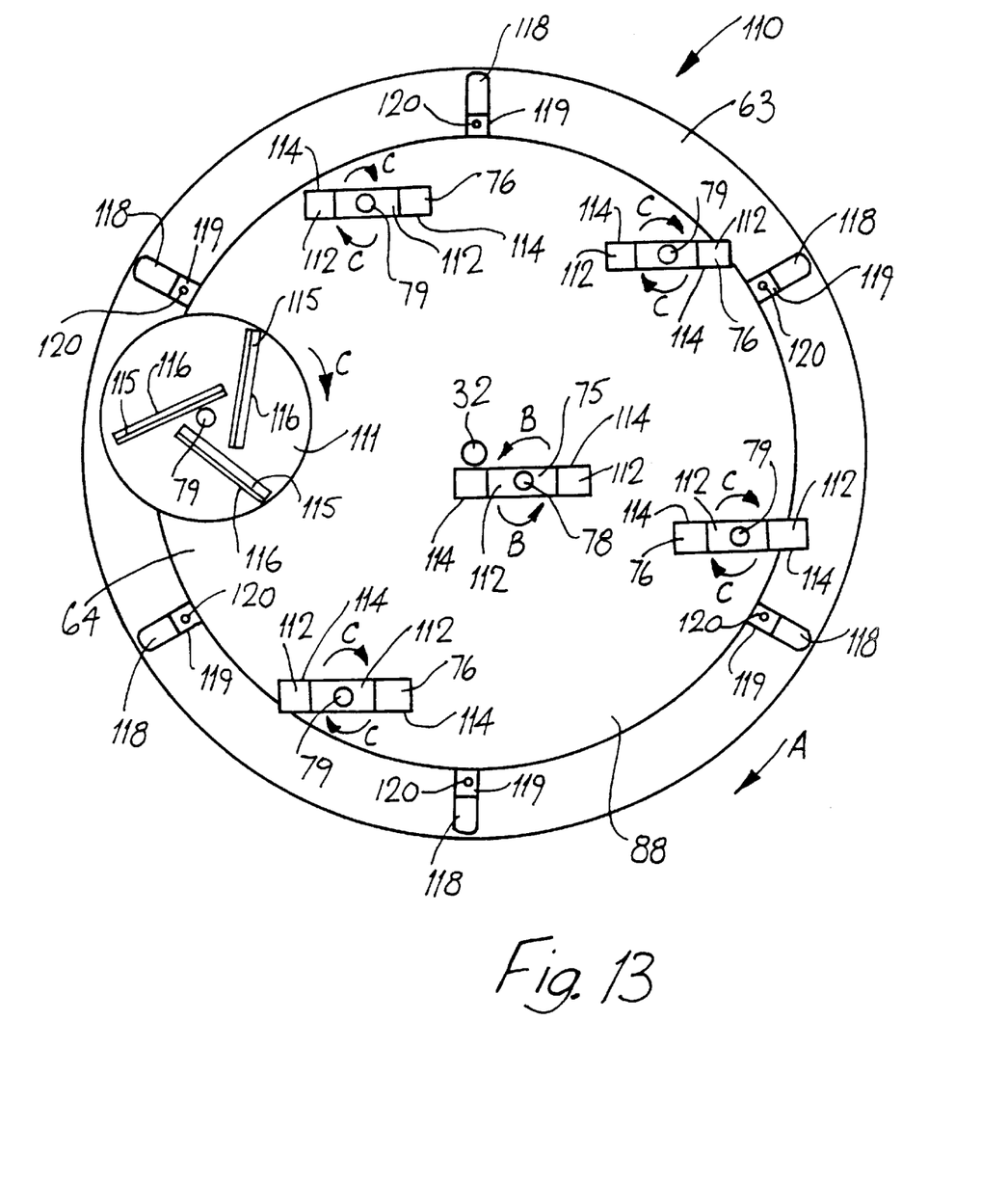
FIG. 13 is an elevational view of a dispensing rotor according to another embodiment of the invention for use in the spreader wagon of FIG. 1.
Figures 14, 15:
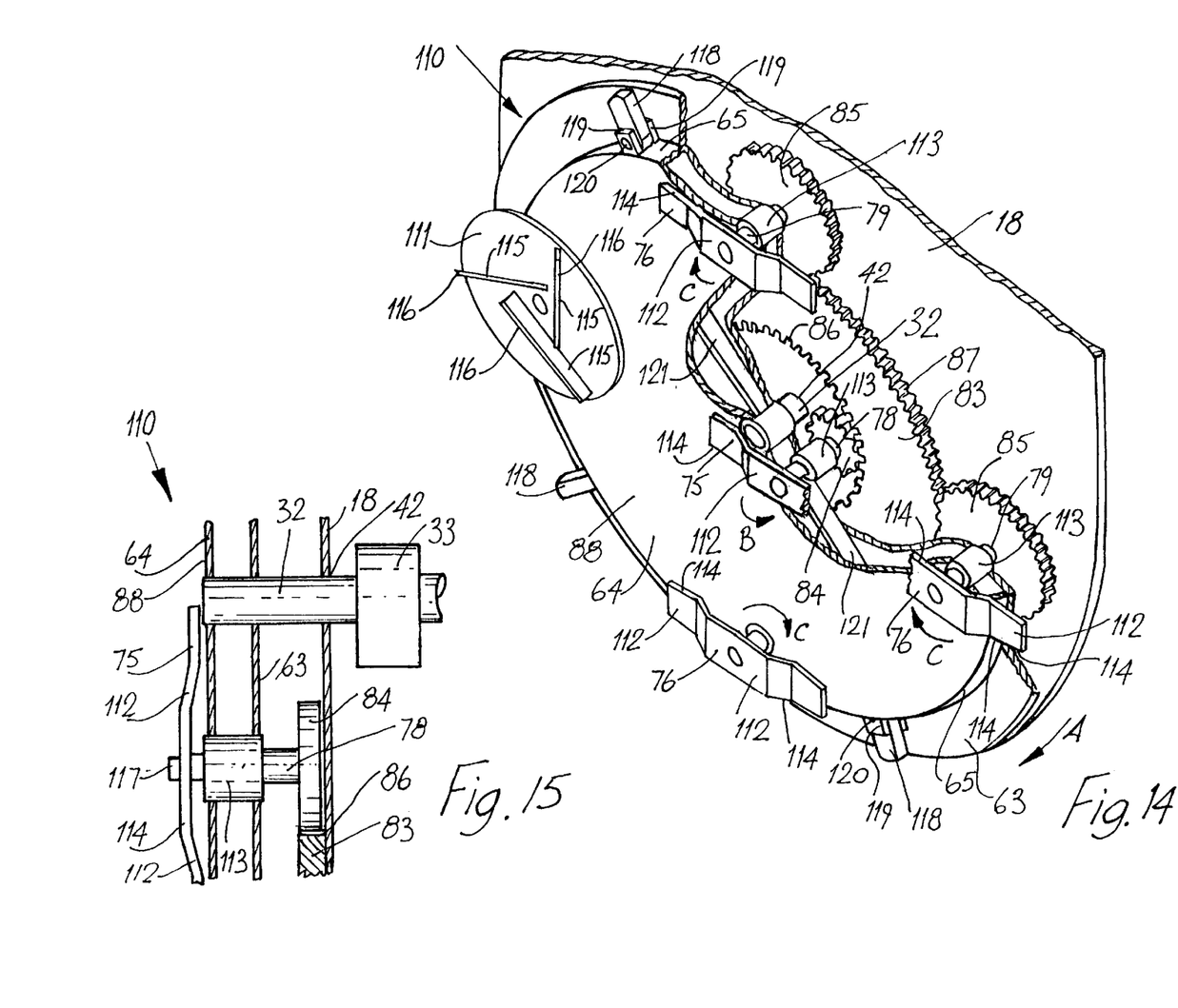

Referring now to FIGS. 13 to 15 there is illustrated a dispensing rotor 110 according to another embodiment of the invention for use in the spreader wagon 1 of FIGS. 1 to 11. The dispensing rotor 110 is substantially similar to the dispensing rotor 30 described with reference to FIGS. 1 to 11, and similar components are identified by the same reference numerals. The dispensing rotor 110 is illustrated mounted on the end wall 18 of the spreader wagon 1. In this embodiment of the invention the separating means comprises four outer separating members 76 which are rotatable in the direction of the arrow C as the dispensing rotor 110 rotates in the direction of the arrow A, and one inner separating member 75 which is rotatable in the direction of the arrow B as the dispensing rotor 110 rotates in the direction of the arrow A. Additionally, the separating means comprises a separating disc 111 which is rotatable in the direction of the arrow C as the dispensing rotor 110 rotates in the direction of the arrow A. The inner and outer separating members 75 and 76 are of steel and are substantially similar to the inner and outer separating members 75 and 76 of the dispensing rotor 30 with the exception that separating arms 112 formed by the inner and outer separating members 75 and 76 are of different shape to the separating arms 77 of the inner and outer separating members 75 and 76 of the dispensing rotor 30. Cutting blades similar to the cutting blades 89 of the dispensing rotor 30 are omitted on the separating arms 112. However, leading edges 114 of the separating arms 112 may be provided with a cutting edge for further enhancing the ripping action of the inner and outer separating members 75 and 76 for ripping material from the mass of material in the container 10.

Each outer separating member 76 is carried on an outer secondary drive shaft 79 which is similar to the outer secondary drive shaft 79 of the dispensing rotor 30. Outer pinions 85 are rigidly mounted on the outer secondary drive shaft 79 as already described with reference to the dispensing rotor 30. The inner separating member 75 is mounted on an inner secondary drive shaft 78 which in turn carries an inner pinion 84 in similar fashion as in the case of the dispensing rotor 30. The separating disc 111 is rigidly carried on an outer secondary drive shaft 79 similar to the other outer secondary drive shafts 79, and an outer pinion 85 rigidly mounted on the outer drive shaft 79 co-operates with the stationary ring gear 83 for rotating the separating disc 111 in the direction of the arrow C in similar fashion as the outer separating members 76 are rotated. The inner and outer secondary drive shafts 78 and 79 are rotatably carried in sleeves 113 which extend between and are secured to the main and secondary rotor discs 63 and 64. Bearings (not shown) at respective opposite ends of the sleeves 113 rotatably carry the inner and outer secondary drive shafts 78 and 79 in the sleeves 113. Bolts 117, which are only illustrated in FIG. 15 extend through the inner and outer separating members 75 and 76 and the separating disc 111 for securing the separating members 75 and 76, and the separating disc 111 to the respective inner and outer secondary drive shafts 78 and 79.

The separating disc 111 is circular and is of steel plate material. Elongated cutting blades 115 of steel are welded to the separating disc 111 and are provided with leading cutting edges 116 for cutting and ripping material from the mass of material in the container 10. The cutting blades 115 while not extending directly radially from the rotational axis 95 of the separating disc 111, extend substantially radially to a position adjacent the periphery of the separating disc 111. The cutting blades 115 are substantially spaced at 120° intervals circumferentially around the rotational axis 95 of the separating disc 111, and are slightly inclined to provide a positive angle of attack by the cutting edges 111 to the material in the container 10.

In this embodiment of the invention dispensing ribs have been dispensed with, however, six dispensing members 118 are pivotally carried on pairs of mounting brackets 119 by pivot pins 120 for dispensing animal feed separated by the inner and outer separating members 75 and 76 and the separating disc 111 through the dispensing outlet 21 in the container 10. The pairs of mounting brackets 119 are of steel and are welded to the spacer band 65 at equi-spaced intervals of 60° around the spacer band 65. The dispensing members 118 are of steel and are free to pivot through approximately 180° about the respective pivot pins 120, so that on an obstruction being encountered by a dispensing member 118, the dispensing member 118 pivots to prevent jamming of the dispensing rotor 110.

Reinforcing ribs 121 extend between the main and secondary rotor disc 63 and 64 from the main rotational axis of the dispensing rotor 110 to the spacer band 65 for strengthening the dispensing rotor 110. In this embodiment of the invention six reinforcing ribs 121 are provided at equi-spaced intervals of 60° around the rotational axis of the dispensing rotor 110.

Operation of the dispensing rotor 111 in the container 10 is substantially similar to the operation of the dispensing rotor 30.

It is envisaged that in certain cases, dispensing ribs may be provided on the dispensing rotor 110 extending from the spacer band 65 to the peripheral edge 68 of the main rotor disc 63.

It is envisaged that in certain cases the cutting means at the free ends of the inner and outer separating members of the dispensing rotors 30 and 100 may be dispensed with, and in which case, it is envisaged that the leading edges of the inner and outer separating members may but not necessarily be shaped to form cutting edges.

While the dispensing rotors 30 and 100 have been described as being provided with a pair of separating members, and the dispensing rotor 110 has been described as being provided with five separating members, in certain cases, it is envisaged that a single separating member would be sufficient. In general, where a single separating member is provided on the dispensing rotor, it is believed preferable that the separating member should rotate in the opposite rotational direction to that of the dispensing rotor. Additionally, it is envisaged that the rotational axis of the separating member should be reasonably spaced apart from the rotational axis of the dispensing rotor, and preferably, the separating member should be located so that the locus of its outer peripheral edge while being within the outer periphery of the dispensing rotor should be relatively close to the outer peripheral edge of the dispensing rotor. It is also envisaged that in certain cases the preferred location of the rotational axis of the separating member would be half way between the rotational axis of the dispensing rotor and the peripheral edge of the dispensing rotor.

While the separating members have been described as forming separating arms extending radially on opposite sides of the secondary drive shafts, in certain cases, it is envisaged that a single arm may be provided extending on one side only of the rotational axis of the secondary drive shaft. It will also be appreciated that more than two separating arms may be provided extending from each secondary drive shaft, indeed, it is envisaged that separating members of other shape, configuration and construction may be provided. It is envisaged that in certain cases cutting means other than those described may be provided on the separating members, indeed, any suitable cutting means may be provided, and it will of course be appreciated in certain cases that the cutting means may be dispensed with.

It is further envisaged that in certain cases the dispensing rotor may be of other shape and construction for dispensing material through the outlet.

While the main and secondary transmission means have been described as being interconnected, while this is preferable, it is not essential, in certain cases, it is envisaged that the separating means may be driven independently of the dispensing rotor.

While the separating members have been described as rotating at approximately two and a half times the speed of the dispensing rotor, the separating members may rotate at any other desired speed, faster or slower than the dispensing rotor, or at a speed equal to that of the dispensing rotor.

While two of the dispensing rotors have been described as comprising dispensing ribs which extend from positions adjacent the rotational axis of the dispensing rotor, it will of course be appreciated that in certain cases, the dispensing ribs may only extend from the spacer band, and in the case of the dispensing rotor of FIG. 12, it is also envisaged that the dispensing ribs need not extend from a position adjacent the rotational axis of the dispensing rotor, but rather, from a position intermediate the rotational axis and the outer peripheral edge of the dispensing rotor.

While the clearance between the dispensing rotor and the base of the container has been described as being between 8 mm and 15 mm, the clearance between the dispensing rotor and the base may be in the range of 5 mm to 100 mm, although, preferably, the clearance between the dispensing rotor and the base should be in the range of 8 mm to 75 mm, and preferably, 8 mm to 20 mm. Ideally, it should lie between 8 mm and 15 mm. If the clearance between the dispensing rotor and the base is too great, stones, and other foreign matter may jam between the dispensing rotor and the base, while on the other hand, if the clearance between the dispensing rotor and the base is too small, misalignment of bearings and/or wear in bearings may cause the dispensing rotor to rub against the base.

We claim:

1. Apparatus for spreading material, the apparatus comprising:

an elongated container (10) for the material extending from an upstream end (12) to a downstream end (14) and defining a longitudinally extending central axis (20), a dispensing outlet (21) from the container (10) being located adjacent the downstream end (14) thereof, a dispensing rotor (30,100,110) mounted in the container (10) adjacent the downstream end (14) defining a main rotational axis (20), the main rotational axis (20) extending parallel to the central axis (20) of the container (10), the dispensing rotor (30, 100, 110) being rotatable about the main rotatable axis (20) for dispensing material from the container (10) through the dispensing outlet (21), and a separating means (75,76,111) mounted on the dispensing rotor (30,100,110) for separating material for dispensing by the dispensing rotor (30,100,110) from the mass of material in the container (10), the separating means (75,76,111) being rotatably mounted on the dispensing rotor (30,100,110) about a secondary rotational axis (94,95), and being rotatable relative to the dispensing rotor (30,100,110) for ripping and separating the material for dispensing from the mass of material.

2. Apparatus as claimed in claim 1 wherein the secondary rotational axis (94,95) of the separating means (75,76,111) extends parallel to the main rotational axis (20) of the dispensing rotor (30,110, 110).

3. Apparatus as claimed in claim 1 wherein the secondary rotational axis (94,95) of the separating means (75,76,111) is offset from the main rotational axis (20) of the dispensing rotor (30,100,110).

4. Apparatus as claimed in claim 1 wherein the separating means (75,76,111) comprises a separating arm (77) extending transversely from and to one side of the secondary rotational axis (94,95).

5. Apparatus as claimed in claim 4 wherein a pair of separating arms (77) are provided extending on respective opposite sides of the secondary rotational axis (94,95), each separating arm (77) extending radially relative to the secondary rotational axis (94,95), and a leading edge of each separating arm (77) acts as a cutting edge for separating the material to be dispensed from the mass of material in the container (10).

6. Apparatus as claimed in claim 1 wherein the separating means (75,76,111) comprises a separating disc (111).

7. Apparatus as claimed in claim 1 wherein the separating means (75,76,111) comprises a cutting means (89) for cutting material from the mass of material in the container (10).

8. Apparatus as claimed in claim 1 wherein the separating means (75,76,111) is rotatable in a plane parallel to the plane of rotation of the dispensing rotor (30,100,110), and the separating means (75,76,111) rotates substantially in its own plane.

9. Apparatus as claimed in claim 1 wherein a main drive transmission means (32,36,31) is provided for transmitting drive to the dispensing rotor (30,100,110) for rotation thereof, and a secondary drive transmission means (78,79, 83,84,85) is provided for transmitting drive to the separating means (75,76,111) for rotation thereof, the main and secondary drive transmission means being interconnected with each other so that the rotational speed of the separating means (75,76,111) is a function of the rotational speed of the dispensing rotor (30,100,110).

10. Apparatus as claimed in claim 9 wherein the main drive transmission means (31,32,36) comprises a main drive shaft (32) co-axial with the main rotational axis (20) and extending rigidly from the dispensing rotor (30,100,110) for rotating the dispensing rotor (30,100,110), the main drive shaft (32) being rotatably mounted in the container (10), and the secondary drive transmission means (78,79,83,84,85) comprises a secondary drive shaft (78,79) co-axial with the secondary rotational axis (94,95) of the separating means (75,76) and rigidly connected thereto, the secondary drive shaft (78,79) being rotatably mounted in the dispensing rotor (30,100,110), and the secondary drive transmission means further comprising a first drive transmission element (83) and a second drive transmission element (84,85), the first drive transmission element (83) being co-axially mounted with the main drive shaft (32), and the second drive transmission element (85) being rigidly and co-axially mounted on the secondary drive shaft (78,79) so that on rotation of the dispensing rotor (30,100,110) by the main drive shaft (32), the first and second drive transmission elements (83,84,85) co-operate for rotating the separating means (75,76,111).

11. Apparatus as claimed in claim 1 wherein the separating means (75,76,111) is rotated in a rotational direction opposite to the rotational direction in which the dispensing rotor (30,100,110) is rotated.

12. Apparatus as claimed in claim 1 wherein the separating means (75,76,111) is rotated in a rotational direction similar to the rotational direction in which the dispensing rotor (30,100,110) is rotated.

13. Apparatus as claimed in claim 1 wherein a pair of separating means (75,76,111) is mounted on the dispensing rotor (30,100,110), the secondary rotational axes (94,95) defined by the respective separating means (75,76,111) extending parallel to, and being spaced apart from each other.

14. Apparatus as claimed in claim 13 wherein the secondary rotational axis (94) of one of the separating means (75,76,111) is closer to the main rotational axis (20) than the secondary rotational axis (95) of the other separating means (75,76,111), and the separating means (75), the secondary rotational axis of which is closest to the main rotational axis (20) rotates in the opposite rotational direction to that of the dispensing rotor (30,100,110).

15. Apparatus as claimed in claim 13 wherein the respective separating means rotates in directions opposite to each other.

16. Apparatus as claimed in claim 1 wherein the separating means (75,76,111) rotates at a rotational speed of up to ten times faster than the rotational speed of the dispensing rotor (30,100,110).

17. Apparatus as claimed in claim 1 wherein the dispensing rotor (30,100,110) defines an upstream facing surface (88) facing in a generally upstream direction, the separating means (75,76,111) being located adjacent the upstream facing surface (88), and the upstream facing surface (88) being free of projections for preventing snagging of material on the dispensing rotor (30,100,110) between the separating means (75,76,111) and the upstream facing surface (88), the separating means (75,76,111) being rotatable in a plane parallel to the upstream facing surface (88).

18. Apparatus as claimed in claim 1 wherein the dispensing rotor (30,100,110) comprises a main rotor disc (63) of circular shape, the geometrical center of the main rotor disc (63) coinciding with the main rotational axis (20), a plurality of dispensing ribs (67) being mounted on the main rotor disc (63) and extending from the main rotor disc (63) in an upstream direction and in a generally radial direction for dispensing material through the dispensing outlet (21), the dispensing ribs (67) being spaced apart circumferentially around the main rotor disc (63), the dispensing ribs (67) being equi-spaced circumferentially around the main rotor disc (63).

19. Apparatus as claimed in claim 18 wherein a secondary rotor disc (64) is connected to the main rotor disc (63), the secondary rotor disc (64) extending parallel to the main rotor disc (63), and being located intermediate the main rotor disc (63) and the separating means (75,76,111), the secondary rotor disc (64) defining the upstream facing surface (88), the secondary rotor disc (64) being of circular shape, and being of diameter less than the diameter of the main rotor disc (63), the dispensing ribs (67) extending from the secondary rotor disc (64), and extending between the main and secondary rotor discs (63,64), and a peripheral spacer band (65) extends around the secondary rotor disc (64) and extends between the secondary rotor disc (64) and the main rotor disc (63) for rigidly securing the main and secondary discs (63,64) together, the dispensing ribs (67) extending radially from the peripheral spacer band (65), each dispensing rib (67) terminating at a radial position corresponding to the outer periphery of the main rotor disc (63), and a dispensing member (118) is pivotally mounted on the dispensing rotor (30,100,110) for ripping material from the mass of material in the container (10) and dispensing the material through the dispensing outlet (21), the dispensing member (118) being mounted on a periphery of the dispensing rotor (30,100,110), and extends generally radially outwardly therefrom, and preferably, a plurality of dispensing members (118) are provided spaced apart circumferentially around the dispensing rotor (100).

20. Apparatus as claimed in claim 1 wherein the container (10) comprises a base (15) of semi-circular cross-section having an axis (20) of generation which coincides with the central axis (20) of the container (10), and a pair of spaced apart side walls (16,17) extending generally upwardly from the base (15) and between the upstream and downstream ends (12,14), and a downstream end wall (18) extending upwardly from the base (15) between the side walls (16,17), the main drive shaft (32) being rotatable in and extends through the end wall (18), an urging means (45) for urging the material in the container towards the dispensing rotor (30,100,110) is provided, and an isolating means (55) extends transversely of the central axis (20) and is located in the container (10) adjacent the downstream end (14) and upstream of the dispensing rotor (30,100,110), the isolating means (55) being movable between a closed position for isolating the dispensing rotor (30,100,110) from a portion (56) of the container (10) which is upstream of the isolating means (55) to an open position whereby the dispensing rotor (30,100,110) communicates with the upstream Portion (56) of the container (10).

21. A dispensing rotor for apparatus for spreading material, the dispensing rotor (30,100,110) comprising:

a means (32) for rotatably mounting the dispensing rotor (30,100,110) in the apparatus for dispensing material from the apparatus through a dispensing outlet (21) therefrom, and a separating means (75,76,111) being mounted on the dispensing rotor (30,100,110) for separating material from the mass of material in the container (10), the separating means (75,76,111) being rotatably mounted on the dispensing rotor (30,100,110) about a secondary rotational axis (94,95), and being rotatable relative to the dispensing rotor (30,100,110) for ripping and separating the material for dispensing from the mass of material.

* * * * *